Figure 1:
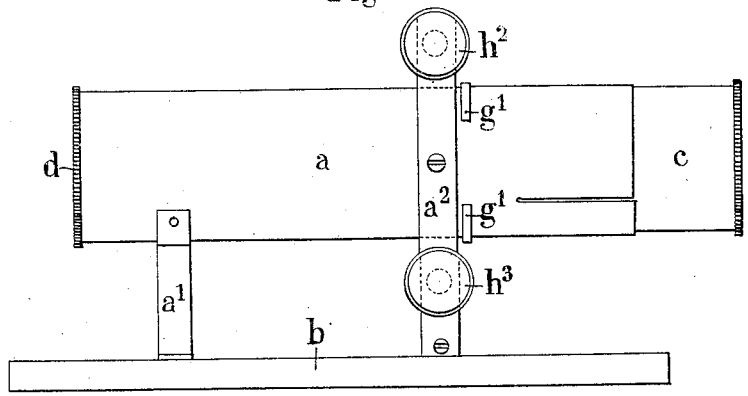

C. F. DUSSAUD.
PROJECTION APPARATUS.
APPLICATION FILED MAR. 7, 1912

1,150,350.

Patented Aug. 17, 1915.
4 SHEETS—SHEET 1.

WITNESSES
R. Aberli
Louis Alexander

INVENTOR
CHARLES F. DUSSAUD
BY
Pierront Knauth
ATTORNEYS

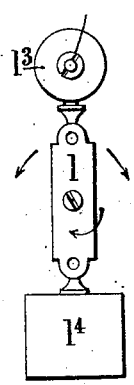
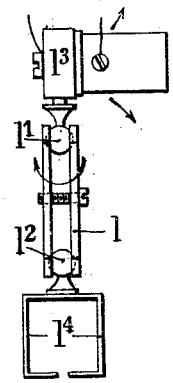
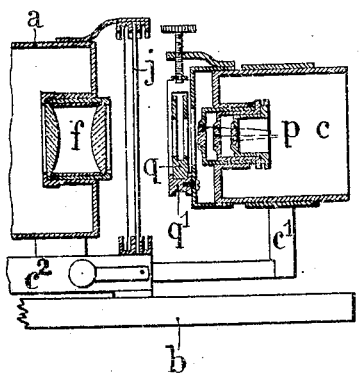
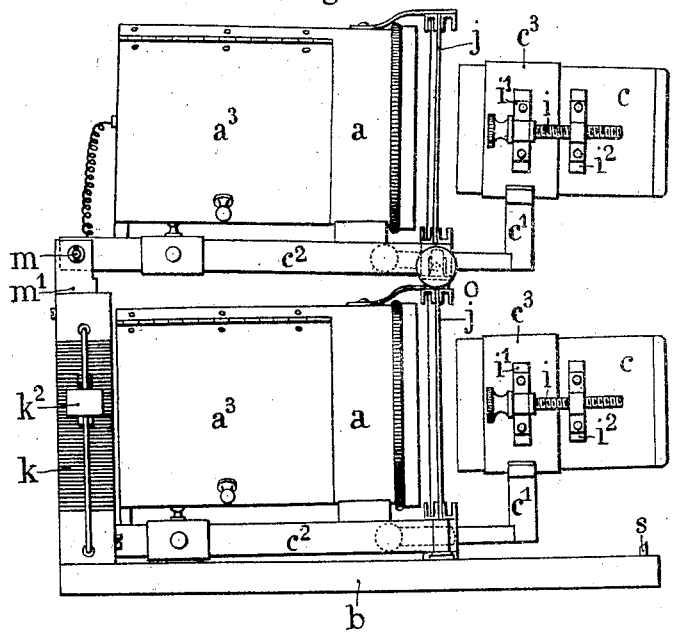

C. F. DUSSAUD.
PROJECTION APPARATUS.
APPLICATION FILED MAR. 7, 1912.

1,150,350.

Patented Aug. 17, 1915.
4 SHEETS—SHEET 4.

WITNESSES
R. Aberli
Louis Alexander

INVENTOR
CHARLES. F. DUSSAUD
BY
Brierent Knauth
ATTORNEYS

UNITED STATES PATENT OFFICE.

CHARLES FRANÇOIS DUSSAUD, OF PARIS, FRANCE.

PROJECTION APPARATUS.

1,150,350.

Specification of Letters Patent.

Patented Aug. 17, 1915.

Application filed March 7, 1912. Serial No. 682,256.

*To all whom it may concern:*

Be it known that I, CHARLES FRANÇOIS DUSSAUD, of 19 Rue Guillaume Tell, in the city of Paris, Republic of France, have invented an Improved Projection Apparatus, of which the following is a full, clear, and exact description.

This invention has for its object a system for projecting images upon a screen by means of an electric source of small wattage so as to bring about in the most convenient and economical conditions the projection of transparent or opaque objects.

The principle of the invention proceeds from the two following observations: 1. It is known that it is possible by sending a current having a voltage superior to the normal in electric bulbs provided with metallic filament (preferably of tungsten) to produce a more intense light, but with a more rapid consumption of the lamp. 2. It is necessary, considering the heat given off by the actual luminous sources, to remove these sources from the condensers so as to avoid the breaking of the latter or the deterioration of the objects to be projected.

In order to remedy these inconveniences and to make the best of a given source of electric energy, I propose to use luminous sources of relatively low wattage and to place these sources as near as possible to the condensers, which allows of a better utilization of the light, according to the well known physical law according to which the illumination, produced by a luminous point, varies in the inverse ratio of the squares of distances.

For the purpose of reducing as much as possible the distance from the lamp to the condenser, the latter is made with a high convexity, so as to have a very short focal distance.

In the apparatus carrying out the invention (which will be described hereafter) the metallic filament of the incandescent lamp is wound as a solenoid with turns of very small diameter and very close to each other, so as to constitute as much as possible a luminous point. The lamp thus arranged is placed beyond the focus of the condenser, when projecting transparent bodies, or opaque bodies from behind, at a very small distance from the condenser, by reason of the special shape of the latter.

The intensity of the luminous source is adjusted at will by means of rheostats of special construction.

The accompanying drawings illustrate, by way of example, apparatus embodying my invention.

Figure 2:
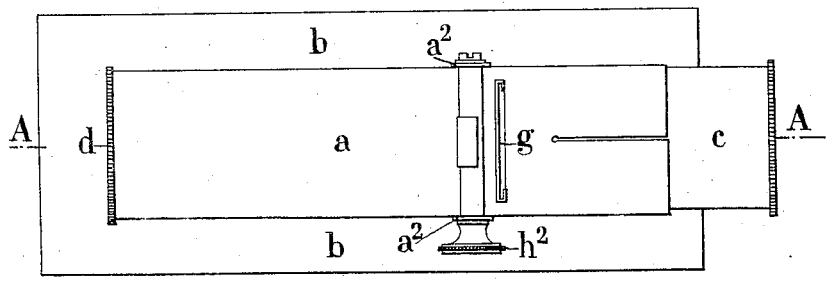
Figure 3:
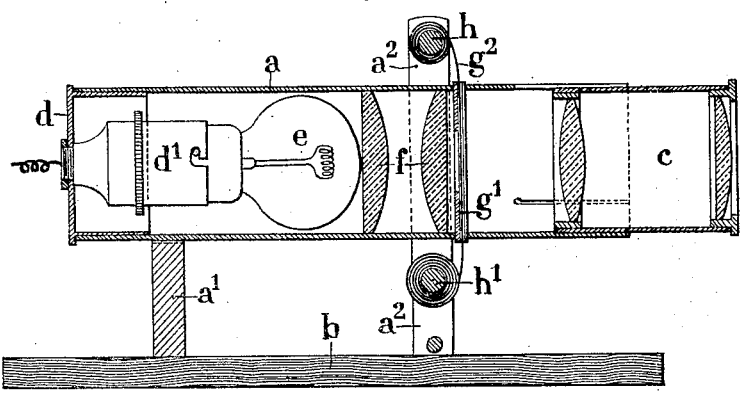
Figure 4:
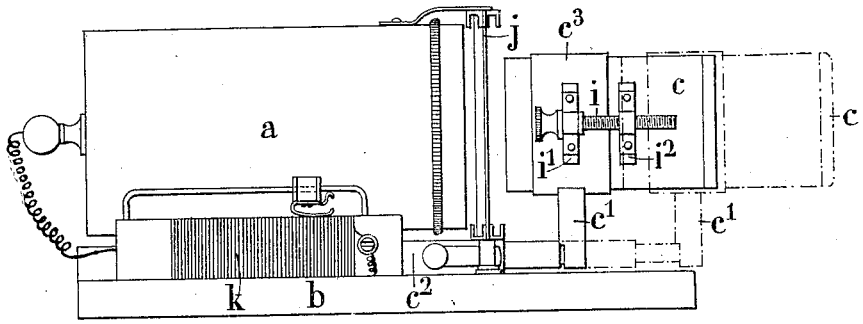
Figure 5:
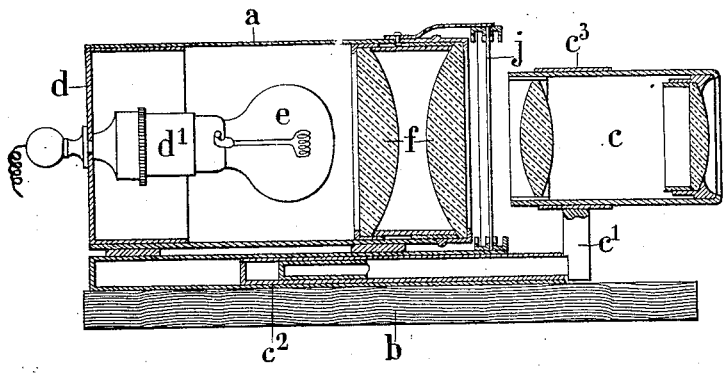
Figure 6:
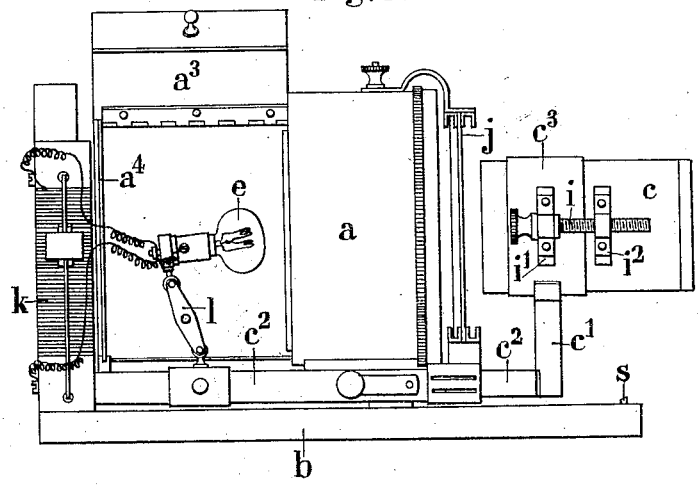
Figure 10:
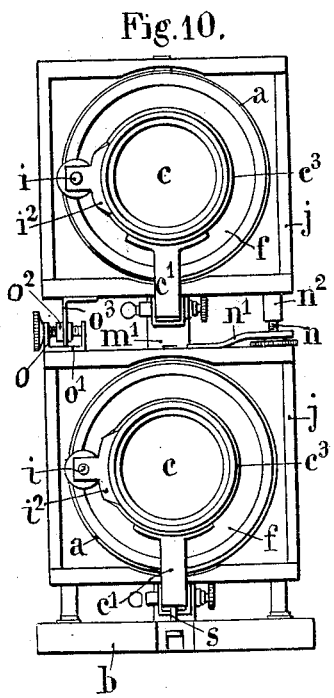
Figure 11:
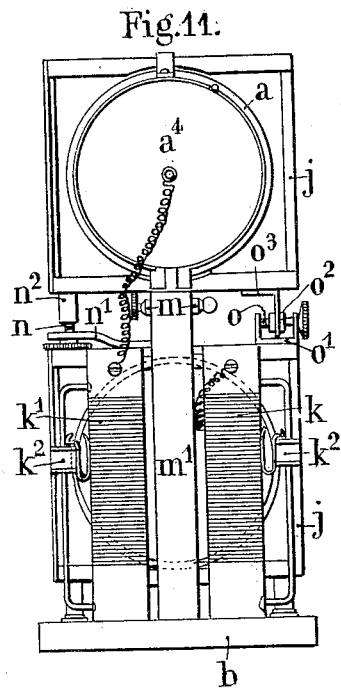
Figure 13:
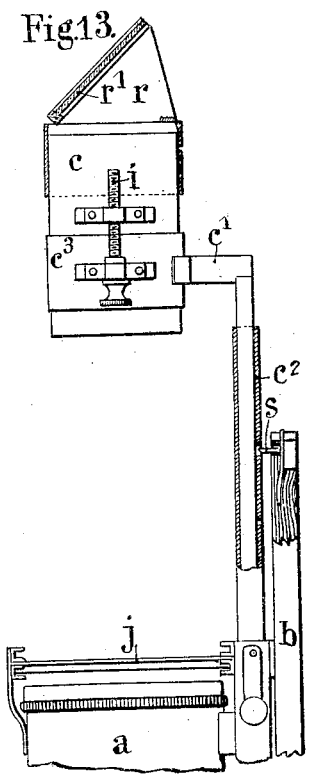

Figure 1 shows in elevation a simple apparatus for the projection of rectangular positive images or of strips bearing a series of positive images; Fig. 2 is a corresponding plan view thereof; Fig. 3 is a longitudinal vertical section made on line A A of Fig. 2; Figs. 4 and 5 illustrate in elevation and longitudinal vertical section a modification provided with a rheostat; Fig. 6 is a modification of the apparatus illustrated in Figs. 4 and 5; Figs. 7 and 8 show in front and side view respectively a hinged support for the electric lamp; Fig. 9 shows in elevation a double apparatus for blending views; Fig. 10 illustrates the same apparatus in front view; Fig. 11 is a back view thereof; Fig. 12 shows an apparatus arranged for the projecting of microscopic views. Fig. 13 illustrates an apparatus arranged for the projection of images of opaque bodies directly lighted from behind.

The apparatus illustrated Figs. 1 to 3 comprises a tubular body $a$ arranged horizontally and held by supports $a^1$ $a^2$ secured on a small board $b$. At one of the ends of the body $a$ is placed an objective $c$ sliding in the said body for focusing purposes. The other end of the body $a$ is closed by a cover $d$ on the inner face of which is secured a support $d^1$ adapted to receive an electric bulb $e$ provided with a metallic filament, preferably of tungsten. This metallic filament forms a winding which is very tight but of small size, so as to condense the luminous surface and reduce it, as much as possible, to a point.

In front of the electric bulb $e$ and very near it is arranged a short focus condenser $f$ held in any suitable way within the body $a$. This body is provided in front of the condenser $f$, with a transverse slot $g$ adapted to receive the images to be projected. In this slot $g$ can also be inserted a guide $g^1$ allowing the regular passage of a film $g^2$ bearing a series of views. In this case, the film $g^2$ is wound on a horizontal axis $h$ arranged above the body $a$ and the ends of which are engaged in openings provided in the support $a^2$. After its passage in front of the condenser $f$, the film $g^2$ is rewound on an axis $h^1$ arranged under the body $a$ and held by the support $a^2$, as shown in the drawings. Two milled heads $h^2$ and $h^3$ secured to the ends of the axes $h$ and $h^1$ allow to wind and unwind the film $g^2$.

The apparatus thus arranged allows of obtaining very luminous projections with an electric lamp of small wattage and without any risk of heating the condenser and the film.

Figs. 4 and 5 illustrate a more improved projection apparatus. In this apparatus, the condenser $f$ is arranged at one of the ends of the body $a$, the other end of the latter being closed by a cover $d$ carrying the support $d^1$ of the electric bulb $e$, as in the previous arrangement. The objective $c$ is mounted on a support $c^1$ capable of sliding in a guide $c^2$ placed under the body $a$ so as to allow of moving at will the objective toward or from the condenser $f$. The exact focusing of the projected image is obtained by means of a screw $i$ provided with a milled head and engaged in two lugs $i^1$ and $i^2$, the lug $i^1$ being integral with a collar $c^3$ terminating the support $c^1$ and in which is inserted the body of the objective and the lug $i^2$ being integral with this body (Fig. 4).

A double frame $j$ arranged in front of the condenser $f$ allows to place into position the image to be projected and, if necessary, color glasses adapted to color the projections. A rheostat $k$ allows the adjusting at will of the intensity of the luminous source.

Fig. 6 shows a modification of the projection apparatus which has just been described. In this modification, the electric bulb $e$, instead of being mounted on a fixed support, is arranged at the end of a double hinge support illustrated in detail in Figs. 7 and 8. This support comprises two small plates $l$ connected by a screw and the ends of which hold two balls $l^1$ and $l^2$, one of which is secured on the socket $l^3$ of the lamp $e$ and the other is mounted on a sleeve $l^4$ capable of sliding on the guide $c^2$ of the support of the objective $c$. This system of support allows of placing the bulb $e$ in the desired position and especially in such a position that its filament does not project any shadow. Access may be had to the bulb $e$ through a side opening provided in the body $a$ of the apparatus and closed by a door $a^3$ during the projection so as to prevent any escape of light. For the same purpose the body $a$ is closed at its rear end by a metal bottom $a^4$. The intensity of the light may be controlled by means of a rheostat $k$.

Figs. 9 to 11 illustrate a double apparatus more particularly adapted for the projections of blending views. This apparatus comprises two superposed bodies $a$ opposite each of which is arranged an objective $c$ mounted on a sliding support $c^1$. Moreover, each apparatus is provided with a condenser and an electric bulb mounted on the movable support indicated above. Opposite each body $a$ is arranged a frame adapted to support the positive image or images to be projected and if necessary colored glasses for obtaining a colored projection back ground. In order to obtain on the screen the superposition of the images, the upper body $a$ of the apparatus can be more or less vertically inclined. To that end the rear end of the guide $c^2$ of the sliding support of the objective is hinged at $m$ on a metal rod $m^1$ placed vertically behind the lower body of the apparatus. Between the frames $j$ is arranged a screw $n$ having a milled head and extending vertically. This screw $n$ which is held by a metal blade $n^1$ is engaged in a threaded opening provided in a small block $n^2$ integral with the upper frame. It will be understood that the rotation of the screw $n$ in the required direction will determine the lifting or lowering of the front part of the upper body $a$ which will pivot about the joint $m$. The upper body $a$ of the apparatus can also be moved laterally for obtaining the exact adjustment of the projections by means of another milled screw $o$ mounted horizontally in a yoke $o^1$ secured on the lower frame $j$. On this screw $o$ is placed a nut $o^2$ connected by a metal rod $o^3$ to the upper frame of the movable body of the apparatus. The operation of the screw $o$ determines a displacement, in one direction or the other, of the nut $o^2$ and, consequently, of the upper body $a$ of the apparatus with which the frame is integral. The luminous intensity of the bulbs illuminating the two projections can be adjusted at will by means of two rheostats $k$ and $k^1$ provided with slides $k^2$ the operation of which allows of obtaining the most various luminous effects.

Fig. 12 shows an apparatus arranged in such a manner as to allow the projection of microscopic preparations. In this arrangement, the condenser $f$ is of reduced size and the objective $c$ comprises three juxtaposed lenses $p$ arranged opposite the condenser. The microscopic preparation is placed on a movable support $q$ capable of sliding laterally in a guide $q^1$ arranged at the rear part of the objective body.

Fig. 13 illustrates an apparatus arranged so as to allow the projection of opaque bodies as if they were transparent, that is to say directly lighted from behind. In this modification, the whole of the apparatus instead of being placed horizontally is arranged vertically, as illustrated; the body to be projected is placed in front of the condenser and very near the same, or even directly on this condenser. In order to allow the projection of the body upon a horizontal screen, a hood $r$ is arranged at the upper end of the body of the objective $c$, this hood being provided with a mirror $r^1$ inclined at 45°, adapted to reflect the light rays. The objective $c$ can be maintained in the desired position, that is to say more or less removed from the condenser by means of a small spring catch $s$ placed at the end of the board $b$ and capable of fitting in perforations provided in the lower face of the sliding guide $c^2$ of the objective. This spring catch $s$ allows also of immobilizing the objective at the desired point when the projection apparatus is placed in its normal position, that is to say horizontally.

The various forms of projection apparatus which have just been described are intended to project images of transparent views or views directly lighted from behind.

Whatever may be the device adopted, the luminous source being of small size and the condenser having a very short focus, the light will be utilized in the best possible manner, so that the wattage of the light source can be inconsiderable, while allowing to obtain projections as luminous as those requiring an energy from 100 to 200 times greater. The source of electric energy can be a battery, an accumulator or a town current with a lamp intercalated as resistance. According to the source of the current the rheostats $k$ will be different. When the current is an alternating current, there may be interposed a potential transformer, at the two secondary terminals of which there will be obtained an alternating current of the desired voltage. However, these two terminals do not allow the use of contact rheostats. Special resistances will then be used, constituted by a wire wound on a core made of a material non conductive of heat, such as slate or other refractory material. This arrangement allows of remedying to the inconveniences of the rheostats provided with a wooden core, which become hot as soon as the current reaches eight volts and the wires of which then leave their grooves.

In case the current feeding the lamp of the projection apparatus is a continuous current, a lamp forming a resistance will be interposed before the bulb. In this case, as the above mentioned rheostat does not modify very much the intensity of the luminous source, it will be necessary to intercalate between the resistance lamp and the bulb a buffer-accumulator. The use of this buffer-accumulator allows of utilizing contact rheostats, but, in this case if an eight volt bulb is used, four intensities only can be disposed of, and if a sixteen volt bulb is used, eight intensities.

In case an eight volt lamp is employed, it is preferable to use wire rheostats. If a sixteen volt lamp is employed, the contact rheostat is preferable, as, in this case, the length of the wire rheostat is too great and the contacts give a sufficiently varied luminous intensity. These rheostats may be coupled together, as mentioned above, for obtaining blending views or apparitions.

Every projection, obtained with the above described apparatus, can be photographed and in the case of instantaneous exposure, the magnesium can be replaced by the electric-bulb $c$, by sending in the latter a current of sufficient energy so that its filament be burnt at once. This filament will then produce, during a very short time, a dazzling light similar to that of magnesium.

I claim—

1. Projecting apparatus comprising in combination a very short focus condenser, having a diameter sensibly equal to that of the circle in which can be inscribed the image to be projected, a lamp, utilizing a small amount of electric energy, with a metallic filament wound as a solenoid with turns of very small diameter and very close to each other, so as to have a size as reduced as possible and which does not heat, an objective, means for holding the image opposite the condenser and substantially applied against that face of the latter which is turned toward the objective, whereby the image and the adjacent face of the condenser may both be at a distance from the objective equal to the conjugate focal distance of the latter.

2. Projecting apparatus comprising in combination a very short focus condenser, having a diameter sensibly equal to that of the circle in which can be inscribed the image to be projected, a lamp utilizing a small amount of energy, with a metallic filament wound as a solenoid with turns of very small diameter and very close to each other, so as to have a size as reduced as possible, said filament being located nearer to the front face or surface of the electric bulb than it is to the other surface portions, an objective, means for holding the image opposite the condenser and substantially applied against that face of the latter which is turned toward the objective, so that the image and the adjacent face of the condenser may be both at a distance from the objective equal to the conjugate focal distance of the latter.

3. Projecting apparatus comprising in combination a tubular body, within said tubular body a very short focus condenser, having a diameter sensibly equal to that of the circle in which can be inscribed the image to be projected, an adjustable objective in front of the tubular body, a plug or cover closing the opposite end of said tubular body, a lamp utilizing a small amount of electric energy, with a metallic filament, wound as a solenoid with turns of very small diameter and very close to each other, so as to have a size as reduced as possible and which does not heat, the support for this lamp being secured on the inner face of the plug or cover of the tubular body, the lamp being very near the condenser so that the filament is at the focus of the condenser, means for holding the image opposite the condenser and substantially applied against that face of the latter which is turned toward the objective, so that the image and the adjacent face of the condenser may be both at a distance from the objective equal to the conjugate focal distance of the latter.

4. Projecting apparatus comprising in combination a tubular body, within said tubular body a very short focus condenser, having a diameter sensibly equal to that of the circle in which can be inscribed the image to be projected, an adjustable objective fitted in the front end of the tubular body, a plug or cover closing the opposite end of said tubular body, a lamp utilizing a small amount of electric energy, with a metallic filament, wound as a solenoid with turns of very small diameter and very close to each other, so as to have a size as reduced as possible and which does not heat, the support for this lamp being secured on the inner face of the plug or cover of the tubular body, the lamp being very near the condenser so that the filament is at the focus of the condenser, a guide fitted in a slot provided in the tubular body very near to the front face of the condenser and adapted to receive the image to be projected, and two rollers respectively arranged above and below the said tubular body upon which winds and unwinds the film bearing the images to be projected.

The foregoing specification of my universal system for projections by means of low electric energy, signed by me this twenty-seventh day of February 1912.

CHARLES FRANÇOIS DUSSAUD

Witnesses:
 LUCIEN MEMMINGER,
 R. THIRIOT.

Copies of this patent may be obtained for five cents each, by addressing the " Commissioner of Patents. Washington, D. C."